United States Patent [19]

Sugiyama et al.

[11] Patent Number: 4,480,280

[45] Date of Patent: Oct. 30, 1984

[54] ROTARY RECORDING MEDIUM REPRODUCING APPARATUS ADDRESS SEARCH

[75] Inventors: Hiroyuki Sugiyama, Isehara; Masaki Sakurai; Ryozo Abe, both of Yokohama; Kenji Yoshihara, Chiba; Susumu Sakakibara, Sagamihara, all of Japan

[73] Assignee: Victor Company of Japan, Ltd., Kanagawa, Japan

[21] Appl. No.: 403,958

[22] Filed: Aug. 2, 1982

[30] Foreign Application Priority Data

Aug. 18, 1981 [JP] Japan .................. 56-128882

[51] Int. Cl.$^3$ ............................................. G11B 21/10
[52] U.S. Cl. ........................................ 360/78; 360/49; 369/41; 369/43
[58] Field of Search ...................... 360/49, 78; 369/30, 369/33, 41, 43

[56] References Cited

U.S. PATENT DOCUMENTS 3,681,524  8/1972  Nicholls ........................ 360/49 X

FOREIGN PATENT DOCUMENTS 2748042  5/1979  Fed. Rep. of Germany .
2854280  6/1979  Fed. Rep. of Germany .
2011651B  7/1979  United Kingdom .
1573031  8/1980  United Kingdom .
2087102  5/1982  United Kingdom .

Primary Examiner—George G. Stellar
Attorney, Agent, or Firm—Ladas & Parry

[57] ABSTRACT

A rotary recording medium reproducing apparatus for reproducing a rotary recording medium recorded with a program information signal and different kinds of address signals having mutually different predetermined codes in correspondence with the program information signal within a program information signal recorded section. The reproducing apparatus comprises a reproducing element for reproducing recorded signals from the rotary recording medium, a moving device for moving the reproducing element along a radial direction of the rotary recording medium, an address signal detecting circuit for detecting address signals from signals reproduced by the reproducing element, and a driving voltage generating circuit set with an address signal to be searched, for generating a driving voltage in accordance with the kind of set address signal, and supplying the driving voltage thus generated to the moving device. The moving device moves the reproducing element at a speed in accordance with the kind of the address signal.

7 Claims, 10 Drawing Figures

ROTARY RECORDING MEDIUM REPRODUCING APPARATUS ADDRESS SEARCH

BACKGROUND OF THE INVENTION

The present invention generally relates to rotary recording medium reproducing apparatuses capable of performing address search, and more particularly to a reproducing apparatus capable of performing search by varying the moving speed of a reproducing element during search in accordance with time address and during search in accordance with chapter address, in an apparatus for reproducing a rotary recording medium recorded with time addresses and chapter addresses.

A new information signal recording and/or reproducing system has been proposed in U.S. Pat. Nos. 4,315,283 and 4,322,836, of which the assignee is the same as that of the present application. According to this proposed system, the recording system forms pits in accordance with an information signal being recorded along a spiral track on a flat rotary recording medium (hereinafter simply referred to as a disc), without forming a groove therein. In the reproducing system, a reproducing stylus traces over along this track to reproduce the recorded information signal in response to variations in electrostatic capacitance.

In this system, since no grooves for guiding the reproducing stylus are provided on the disc, it becomes necessary to record pilot or reference signals on or in the vicinity of a track of a program information signal, on the disc. Upon reproduction, the reference signals are reproduced together with the program information signal. Tracking control is carried out so that the reproducing stylus accurately traces along the track in response to the reproduced reference signals.

By use of this previously proposed system, there is no possibility whatsoever of the reproducing stylus or the disc being damaged since the recording track has no groove. The reproducing stylus can trace the same portion of the track repeatedly many times, whereby a special reproduction such as still, slow-motion, or quick-motion reproduction becomes possible. Moreover, operations such as a random access, high-speed search, and automatic cueing operation in which the reproducing stylus is shifted to a position of a desired recorded program where the reproduction is to be started, can be performed with ease.

In order to perform operations such as the above random access, high-speed search, and automatic cueing operations, signals such as an address signal (hereinafter referred to as a chapter address signal) for indicating the number of the recorded program, and an address signal (hereinafter referred to as a time address signal) for indicating the position within the recorded program in reproducing time from the start of that recorded program or in reproducing time from the start of the first program recorded on the disc, are recorded onto the disc.

When performing search operations such as the above random access, high-speed search, and automatic cueing operations with respect to a disc recorded with such an address signal, the address of the position where the reproducing stylus is reproducing and a desired address which has been set are compared. According to the difference between the two addresses, the reproducing stylus is moved at a high speed in a radial direction of the disc. It is desirable to perform such a search operation within a short period of time. Hence, it is desirable to move the reproducing stylus at a high speed so that the search operation is performed within the short period of time.

In a case where the desired set address is a time address, it is always possible to accurately detect the difference between the address of the position where the reproducing stylus is presently located, and the above set address. Accordingly, it is possible to move the reproducing stylus at a high speed when the above difference between the two addresses is large, and move the reproducing stylus at a low speed when the above difference is small, to accurately move the reproducing stylus to the target address position within a short period of time.

On the other hand, if the desired set address is a chapter address, it is detected that the reproducing stylus is at the chapter of the set address when the reproducing stylus enters within the chapter of the set address after searching the chapter of a number preceding the chapter number of the set address by one. Hence, an operation is performed to return the reproducing stylus by amount the reproducing stylus moved in excess after entering the chapter of the set address, and stop the reproducing stylus at the beginning position of that chapter.

Accordingly, if the moving speed of the reproducing stylus is set to a high speed desirable during the time address search, the amount the reproducing stylus moves in excess after entering the chapter of the desired address during the chapter address search becomes large. Thus, time is required to return the reproducing stylus in a reverse direction by the above amount moved in excess, and as a result, more time will be required to search for the desired address. Especially if the recording time of the chapter of a number preceding the chapter number of the set address by one is short, the reproducing stylus is moved in excess and passes by the chapter number preceding the chapter number of the set address when the reproducing stylus is returned in the reverse to direction in an attempt to move the reproducing stylus by the above amount moved in excess. In this case, the reproducing stylus is then moved in the forward direction in an attempt to move the reproducing stylus to the beginning position of the above desired chapter, but the reproducing stylus is again moved in excess because the distance to be moved is short and the speed with which the reproducing stylus is moved is high. The above operation in which the reproducing stylus is moved in excess is repeatedly performed, that is, a hunting phenomenon is introduced. Therefore, in this kind of a case, considerable time will be required to move and stop the reproducing stylus at the set address position.

On the other hand, in order to prevent the above inconvenient phenomenon from being introduced, the speed with which the reproducing stylus is moved must be selected to a speed slower than that for the time address search, which is suited for the chapter address search. However, if the above moving speed is selected to the slow speed suited for the chapter address search, there is a disadvantage in that more time will be required to perform the time address search.

SUMMARY OF THE INVENTION

Accordingly, it is a general object of the present invention to provide a novel and useful rotary recording medium reproducing apparatus capable of performing address search, in which the above described disadvantages have been overcome.

Another and more specific object of the present invention is to provide a rotary recording medium reproducing apparatus designed so that a reproducing stylus is moved at different speeds respectively suited for a time address search mode and a chapter address search mode, during a search mode. According to the reproducing apparatus of the present invention, the search can be performed within a short period of time suited for the search mode, during the time address search mode and the chapter address search mode.

Other objects and further features of the present invention will be apparent from the following detailed description when read in conjunction with the accompanying drawings.

DETAILED DESCRIPTION

Figure 1A:
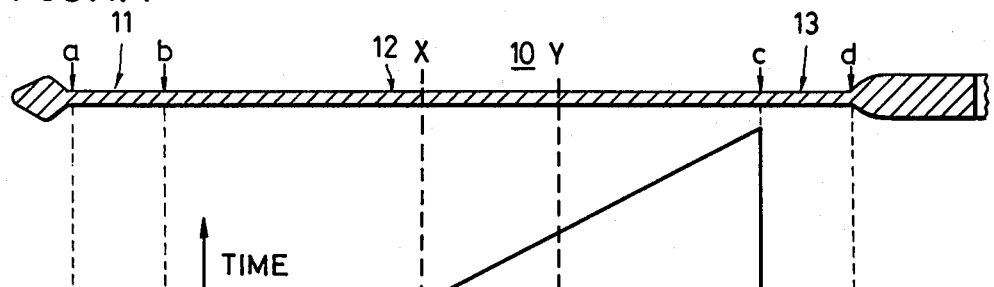
FIG. 1A shows a cross section of a rotary recording medium.

FIG. 1A shows a cross section of a rotary recording medium (hereinafter simply referred to as a disc) 10. A lead-in section 11 is provided between positions a and b, a section 12 recorded with a program information signal is provided between positions b and c, and a lead-out section 13 is provided between positions c and d. The program information signal is not recorded in the lead-in section 11 and the lead-out section 13.

Figure 1B:
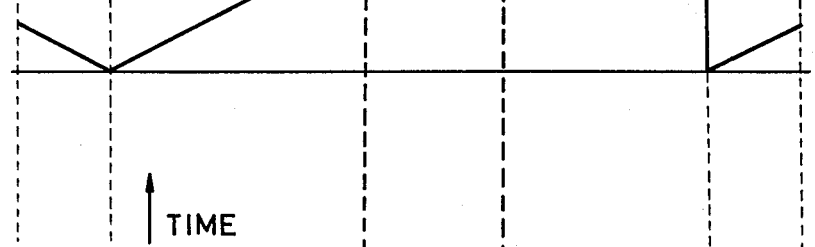
FIG. 1B is a diagram for explaining a time code of an address signal recorded on a rotary recording medium used with respect to a rotary recording medium reproducing apparatus according to the present invention.

A time code signal having a time coder indicated in FIG. 1B is recorded throughout the sections 11 through 13 as an address signal. The time code indicates a position on the disc 10 from the points b and c in time. In the lead-in section 11, the time code is recorded so that the time code is maximum at the outermost peripheral position a and gradually decreases towards the section 12 to become zero at the innermost peripheral position b in the lead-in section 11. In the program information signal recorded section 12, the time code is recorded so that the time is zero at the outermost peripheral position b in the section 12 and gradually increases towards the lead-out section 13 to become maximum at the innermost peripheral position c in the section 12. Moreover, in the lead-out section 13, the time code is zero at the outermost peripheral position c in lead-out section 13 and gradually increases to maximum at the innermost peripheral position d.

Figure 1C:
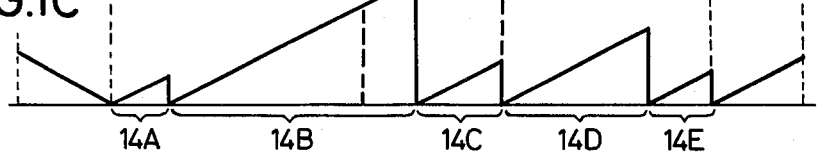
FIG. 1C is a diagram for explaining a chapter code in a manner similar to FIG. 1B.

In addition to the above time code signal, a chapter code signal having a chapter code indicated in FIG. 1C is recorded in the sections 11 through 13. This chapter code indicates the position within the program for each program. In the lead-in section 11, the chapter code is recorded so that the chapter code is maximum at the outermost peripheral position a and gradually decreases towards the section 12 to become zero at the innermost peripheral position b in the lead-in section 11. In the program information signal recorded section 12, the chapter code is recorded for each of recorded information signal programs 14A, 14B, ..., and 14E so that the chapter code is zero at the outermost peripheral end (beginning) of a program and gradually increases towards the innermost peripheral end (finish) of the program. In addition, in the lead-out section 13, the chapter code is zero at the outermost peripheral position c in the lead-out section 13 and gradually increases to become maximum at the innermost peripheral position d. The chapter numbers of the above programs 14A through 14E are respectively designated by zero, first, ..., and fourth chapters.

Next, description will be given with respect to the constitution of the time code signal and the chapter code signal. The time code signal has a constitution shown in FIG. 2A.

Figure 2A:
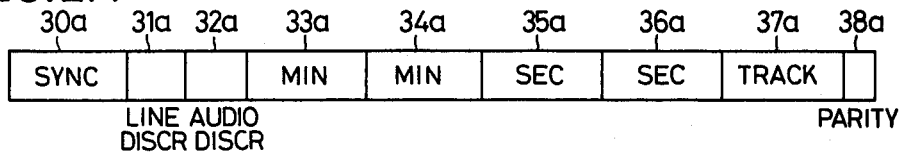
FIGS. 2A and 2B respectively are diagrams for explaining the constitution of a time code and a chapter code.

In FIG. 2A, a code "1101" in binary code is assigned to a 4-bit synchronizing block 30a. A 2-bit line discriminating block 31a is provided for discriminating the time code and the chapter code. A code "10" in binary code is assigned to the block 31a to indicate a time code, and a code "11" in binary code is assigned to the block 31a to indicate a chapter code. A 2-bit audio discriminating block 32a is provide to discriminate whether the audio signal is a monaural or stereo signal.

Blocks 33a through 36a respectively comprise four bits, and indicate time. A 4-bit block 37a indicates the track. The block 33a indicates the tens' column while the block 34a indicates the ones' column for indicating the minutes. The block 35a indicates the tens' column and the block 36a indicates the ones' column for indicating the seconds. When the video signal is of the NTSC system, the disc 10 is rotated at a rotational speed of fifteen revolutions per second by a turntable 41 in a reproducing system shown in FIG. 3. A reproducing stylus 43 advances by fifteen tracks per second towards the inner periphery of the disc. Accordingly, the first through fifteenth track is indicated by hexadecimal indications "0" through "E" by the 4-bit block 37a. On the other hand, when the video signal is of the PAL or the SECAM system, the disc 10 is rotated at a rotational speed of 12.5 revolutions per second. Hence, the first through twelfth tracks, and the first through thirteenth tracks are alternately displayed, since the hexadecimal indications "0" through "B" (or "0" through "C") are obtained in the block 37a when the block 36a is even and the hexadecimal indications "0" through "C" (or "0" through "B") are obtained when the block 36a is odd. Therefore, the twenty-five tracks on the disc 10 the reproducing stylus 43 advances in two seconds, are accordingly indicated.

In the lead-in section 11 of the disc 10, the hexadecimal indication in the block 33a is "F". The time recorded in the blocks 34a through 37a gradually decreases from the position a towards the position b, as shown in FIG. 1B. At the position b, the blocks 33a through 37a all indicate a hexadecimal "0". In the program information signal recorded section 12, the time indicated by the blocks 33a through 37a gradually increases from the position b towards the position c. At the position c, the block 33a indicates a hexadecimal "E", while the blocks 34a through 37a all indicate a hexadecimal "0". Further, in the lead-out section 13, the block 33a indicates a hexadecimal "E", while the time recorded in the blocks 34a through 37a gradually increases from the position c towards the position d. A parity bit 38a is added to the block 37a. The parity bit 38a is provided for an odd parity bit (or even parity bit) with respect to a total number of twenty-eight bits in the blocks 30a through 37a.

Figure 2B:
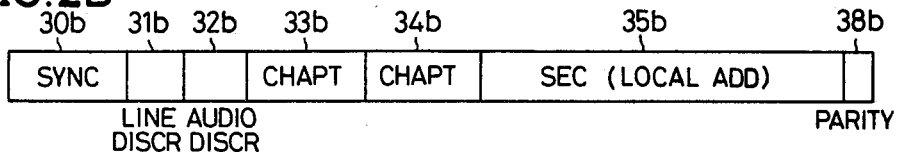

The chapter code has a constitution indicated in FIG. 2B. A synchronizing block 30b, a line discriminating block 31b, an audio block 32b, and a parity bit 38b are the same as those correponding parts in the time code shown in FIG. 2A, and their description will be omitted. Blocks 33b and 34b respectively comprise four bits, and indicate the chapter number. The block 33b indicates the tens' column of the chapter number, and the block 34b indicates the ones' column of the chapter number. A block 35b comprises twelve bits, and indicates the time in seconds (hereinafter referred to as local address) in binary code.

In the lead-in section 11 of the disc 10, hexadecimal "F" is respectively recorded in the blocks 33b and 34b. The local address of the block 35b gradually decreases from the position a towards the position b. At the position b, all the bits constituting the blocks 33b through 35b respectively indicate "0" in binary code. In the program information signal recorded section 12, the blocks 33b and 34b indicate "0" and "0" in hexadecimal code, respectively, the local address in the block 35b gradually increases from "0" in binary code from the position b towards the position c, within the first program 14A. That is, the first program 14A is a zero chapter, and a trademark of the manufacturer, a comment explaining the contents of the recorded program, and the like, are recorded therein. In the second program 14B, the blocks 33b and 34b indicate "0" and "1" in hexadecimal code, respectively, and the local address in the block 35b gradually increases from "0" in binary code from the position b towards the position c. Moreover, in the lead-out section 13, the chapter number in the blocks 33b and 34b are "E" and "E" in hexadecimal code, respectively, and the local address in the block 35b gradually increases from "0" in binary code from the position c towards the position d.

The above synchronizing blocks 30a and 30b and the line discriminating blocks 31a and 31b are respectively provide to obtain the address signal upon reproduction of the disc 10, and discriminate whether it is the time code or the chapter code.

Figure 3:
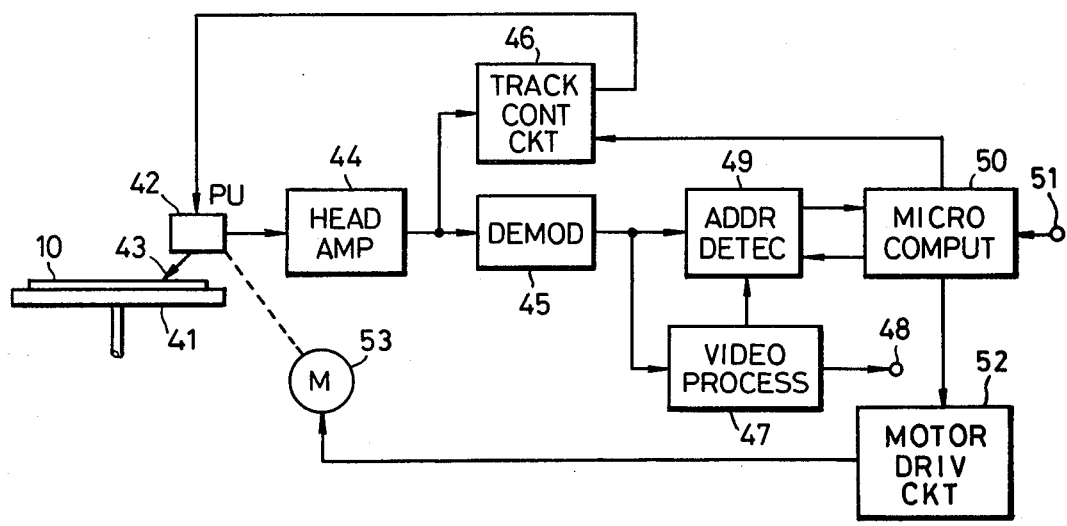
FIG. 3 is a systematic block diagram showing an embodiment of a rotary recording medium reproducing apparatus according to the present invention.

Next, description will be given with respect to an embodiment of a reproducing apparatus according to the present invention for reproducing the above disc 10. In FIG. 3, the disc 10 recorded with the address signal together with the video and audio signals, is rotated at a predetermined rotational speed by the turntable 41. The reproducing stylus 43 of a signal pickup device 42 makes contact with the recording surface of the disc 10, to pick up and reproduce the recorded signal from the disc 10. In the present embodiment, the signal is recorded on the disc 10 as variations in geometrical configuration, and the above recorded signal is reproduced from the disc 10 as variations in electrostatic capacitance between the disc 10 and an electrode of the reproducing stylus 43. Further, reference signals for tracking control are recorded on the disc 10 besides the above signal, and these reference signals are reproduced together with the above signal.

The signal picked up and reproduced from the disc 10, is supplied to a demodulator 45 and a tracking control circuit 46 through a head amplifier 44. Reference signals for tracking control are separated at the tracking control circuit 46, and a tracking control signal is formed from these reference signals. The tracking signal thus formed by the tracking control circuit 46 is supplied to coils used for tracking provided within the signal pickup device 42. Accordingly, tracking control is performed so that the reproducing stylus 43 accurately scans over the video signal tracks on the disc 10.

On the other hand, the picked up video signal is demodulated at the demodulator 45, and then supplied to a video signal processing circuit 47 wherein a predetermined signal processing is performed. Hence, the demodulated video signal thus subjected to the predetermined signal processing, is supplied to a picture tube (not shown) of a receiver from a terminal 48, and reproduced as a reproduced picture. The signal from the demodulator 45 is also supplied to an address signal detection circuit 49 wherein an address signal within the signal thus supplied is detected. The detected address signal is supplied to a micro-computer 50.

Figure 4:
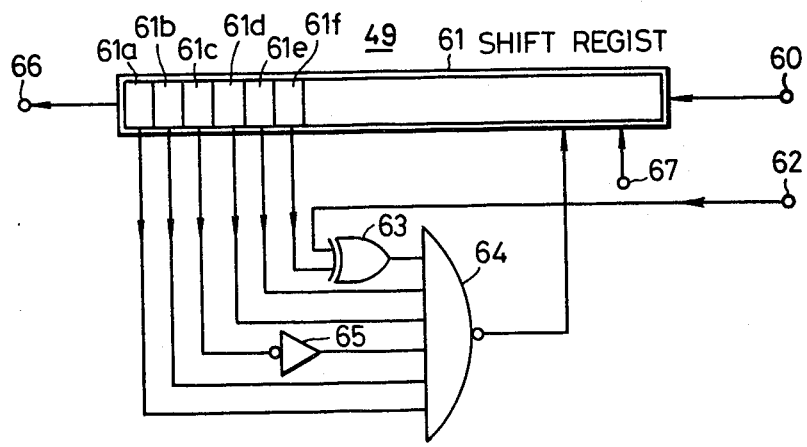
FIG. 4 is a concrete systematic block diagram showing a part of the block system shown in FIG. 3.

The address signal detection circuit 49 comprises a circuit system shown in FIG. 4, for example. The signal from the demodulator 45 is supplied to a shift register 61 through an input terminal 60, to shift the shift register 61 in terms of bits from the right to the left side in FIG. 4. On the other hand, a selection signal for selecting and obtaining either the time code or the chapter code from the micro-computer 50, is supplied to the input terminal of an exclusive-OR circuit 63 through an input terminal 62. For example, it will be first assumed that a signal indicating "1" for obtaining the time code, is supplied from the input terminal 62. Continuous blocks 61a through 61f in terms of bits, are provided in the shift register 61. Respective contents of these blocks 61a through 61f are read out, and supplied to the microcomputer 50 through a terminal 66. The signals read out from the blocks 61a, 61b, 61d, and 61e are directly supplied to a NAND circuit 64. The signal read out from the block 61c is supplied to the NAND circuit 64 after being inverted at an inverter 65. Moreover, the signal read out from the block 61f is supplied to the other input terminal of the exclusive-OR circuit 63. An output signal of the exclusive-OR circuit 63 is supplied to the above NAND circuit 64.

When the contents of the blocks 61a through 61f of the shift register 61 becomes "110110" in binary code, all the inputs to the NAND circuit 64 become "1". Accordingly, the output of the NAND circuit 64 becomes "0", and this output signal is supplied to the shift register 61. The shift register 61 stops the shifting operation when the output signal from the NAND circuit 64 becomes "0", and detects the contents of the time code by individually reading out the blocks 32a through 38a shown in FIG. 2A which are provided within the shift register 61. In addition, when the chapter code is to be obtained, a signal "0" is supplied from the input terminal 62, and the shift register 61 stops the shifting operation when the contents of the blocks 61a through 61f becomes "110111". Hence, similarly as in the case described above, the contents of the chapter code may be obtained.

A vertical synchronizing signal from the video signal processing circuit 47, is applied to the shift register 61 through a terminal 67 as a clear pulse.

A predetermined search address (time or chapter address) set at a setting part (not shown) is applied to the micro-computer 50 through a terminal 51. A signal in accordance with whether the set address is a time address or a chapter address, is supplied to a motor driving circuit 52 from the above micro-computer 50.

Figure 5:
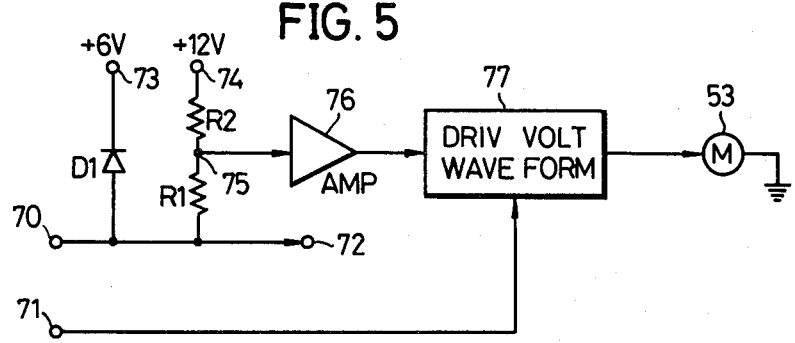
FIG. 5 is a systematic circuit diagram showing a first embodiment of an essential part of the block system shown in FIG. 3.

A first embodiment of the motor driving circuit 52 is shown in FIG. 5. If the set address applied to the microcomputer 50 from the terminal 51 is a time address, a high-level voltage is applied to a terminal 70 from the micro-computer 50. On the other hand, if the set address is a chapter address, a low-level voltage is applied to the micro-computer 50. The high-level or low-level voltage applied to the terminal 70, is applied to the terminal 62 shown in FIG. 4 of the address signal detection circuit 49, through a terminal 72. The anode of a diode D1 is connected to the terminal 70, and the cathode of the diode D1 is connected to a +6 V voltage terminal 73. Resistors R1 and R2 are connected in series between the terminal 70 and a +12 V voltage terminal 74. In the present embodiment, the resistances of the resistors R1 and R2 are the same. The voltage at a connection point 75 between the resistors R1 and R2, is amplified at an amplifier 76, and then supplied to a driving voltage waveform forming circuit 77.

If the set address is a time address, the terminal 70 is ungrounded within the micro-computer 50. Accordingly, the voltage at the terminal 70 becomes equal to +6 V. Moreover, the voltage at the connection point 75 becomes equal to +9 V. This voltage at the connection point 75 is applied to the driving voltage waveform forming circuit 77 through the amplifier 76.

Figure 6:
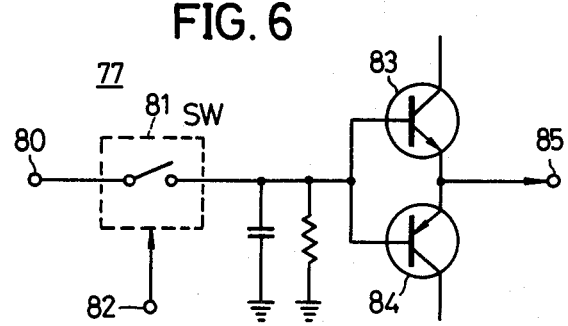
FIG. 6 is a concrete circuit diagram showing a part of the circuit system shown in FIG. 5.

For example, the driving voltage waveform forming circuit 77 has a circuit construction shown in FIG. 6. In FIG. 6, the voltage from the above amplifier 76 is applied to a terminal 80. An electronic switch 81 is connected to this terminal 80. The electronic switch 81 is opened and closed by a signal applied thereto, from an output terminal 71 of the micro-computer through a terminal 82. While the electronic switch 81 is closed, the peak value of the voltage from the terminal 80 is obtained at a terminal 85, though transistors 83 and 84.

In FIG. 1A, if the difference between the present time address position X of the reproducing stylus 43 and a set time address position Y is large (for example, when the difference between the positions X and Y is 256 in tracks), a signal is continuously produced from the terminal 71, and the electronic switch 81 remains closed. Hence, a predetermined voltage is continuously produced from the terminal 85, and applied to a motor 53. Accordingly, the signal pickup device 42 is moved at a first high speed (for example, at a speed which is 900 times the moving speed upon normal reproduction) suited for the time address search.

Next, when the position of the reproducing stylus 43 approaches near the set address position Y and the difference between the positions X and Y becomes less than 256 is tracks, a signal is intermittently obtained from the terminal 71. Thus, the electronic switch 81 is alternately closed and opened by this intermittent signal. Accordingly, a voltage having a waveform wherein the duty cycle is obtained at the above predetermined voltage, is produced from the terminal 85 and applied to the motor 53. As a result, the motor 53 is rotated intermittently, and the signal pickup device 42 is moved at a first low speed (for example, at a speed which is 400 times the moving speed upon normal reproduction) suited for the time address search. When the reproducing stylus 43 reaches a position where the difference between the positions X and Y is less than 64 tracks, the electronic switch 81 is opened, and the reproducing stylus 43 becomes substantially stopped. Thereafter, the reproducing stylus 43 is shifted track by track, until the reproducing stylus 43 reaches the set address position.

On the other hand, if the set address is a chapter address, the terminal 70 is grounded within the microcomputer 50. Hence, the voltage at the terminal 70 becomes zero (low level). In addition, the voltage at the connection point 75 becomes equal to +6 V. This voltage from the connection point 75 is supplied to the driving voltage waveform forming circuit 77 through the amplifier 76.

When there is a difference between the present chapter address position and the set chapter address position, the electronic switch 81 remains closed by the signal from the terminal 71. Accordingly, the motor 53 operates so that the signal pickup device 42 moves at a second high speed (for example, at a speed which is 600 times the moving speed upon normal reproduction) suited for the chapter address search. Next, to move the signal pickup device 42 at a low speed, a duty cycle is given with respect to the voltage waveform obtained from the driving voltage waveform forming circuit 77, by the signal from the terminal 71. Therefore, the signal pickup device 42 is moved at a second low speed (for example, at a speed which is 250 times the moving speed upon normal reproduction) suited for the chapter address search.

Figure 7:
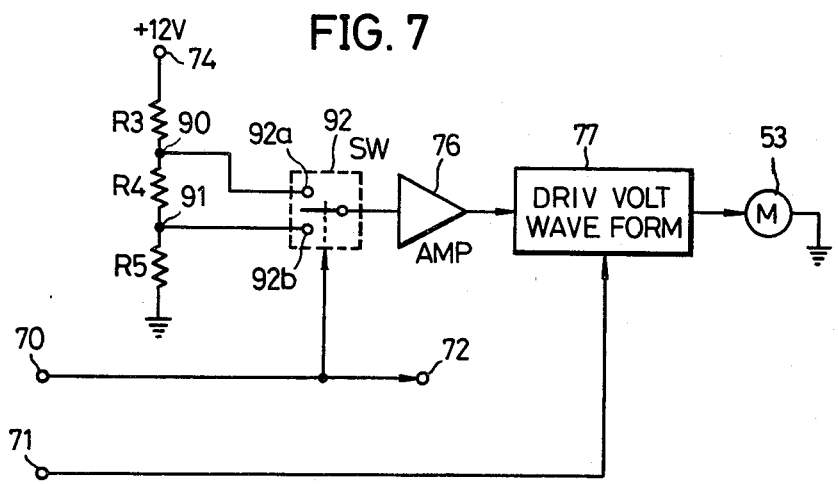
FIG. 7 is a systematic circuit diagram showing a second embodiment of an essential part of the block system shown in FIG. 3.

A second embodiment of the motor driving circuit 52 is shown in FIG. 7. In FIG. 7, those parts which are the same as those corresponding parts in FIG. 5 are designated by the same reference numerals, and their description will be omitted.

Resistors R3, R4, and R5 are connected in series between the +12 V voltage terminal 74 and ground. A connection point 90 between the resistors R3 and R4 is connected to a contact 92a of a switch 92, and a connection point 91 between the resistors R4 and R5 is connected to a contact 92b of the switch 92. A movable contact piece of the switch 92 is switched over according to the signal from the terminal 70. In actual practice, the above switch 92 is constituted by an electronic switch. In the present embodiment, the resistances of the resistors R3, R4, and R5 are selected so that the resistors R3, R4, and R5 satisfy a ratio 7:5:12. Thus, the voltages at the contact points 90 and 91 respectively become equal to +8.5 V and +6 V.

When the set address is a time address, the switch 92 is connected to the contact 92a by the signal from the terminal 70. Similarly, when the set address is a chapter address, the switch 92 is switched over and connected to the contact 92b by the signal from the terminal 70. Accordingly, if the set address is a time address, a voltage having a high peak value is applied to the motor 53, and the signal pickup device 42 is moved at the first high speed an the first low speed which are relatively high speeds suited for the time address search. On the other hand, if the set address is a chapter address, a voltage having a low peak value is applied to the motor 53, and the signal pickup device 42 is moved at the second high speed and the second low speed which are relatively low speeds suited for the chapter address search.

Further, the present invention is not limited to these embodiments, but various variations and modifications may be made without departing from the scope of the present invention.

What is claimed is:

1. A rotary recording medium reproducing apparatus for reproducing a rotary recording medium recorded with a program information signal and different kinds of address signals having mutually different predetermined codes in correspondence with said program information signal within a program information signal recorded section, said reproducing apparatus comprising:

a reproducing element for reproducing recorded signals from said rotary recording medium;

moving means for moving said reproducing element along a radial direction of said rotary recording medium;

address signal detecting means for detecting address signals from signals reproduced by said reproducing element; and driving voltage generating means set with an address signal to be searched, for generating a driving voltage in accordance with the kind of set address signal, and supplying the driving voltage thus generated to said moving means, said moving means moving said reproducing element at a speed in accordance with the kind of said address signal.

2. A reproducing apparatus as claimed in claim 1 in which the address signals recorded on said rotary recording medium comprises a time address signal for indicating recording positions of the information signal from a recording starting position in reproducing time, and a chapter address signal for indicating numbers of information signal programs, and said moving means moves said reproducing element at a first speed when said set address signal is a time address signal and moves said reproducing element at a second speed when said set address signal is a chapter address signal.

3. A reproducing apparatus as claimed in claim 2 in which said driving voltage generating means generates a first driving voltage when said set address signal is a time address signal, and generates a second driving voltage when said set address signal is a chapter address signal.

4. A reproducing apparatus as claimed in claim 1 in which said driving voltage generating means continuously generates said driving voltage when a distance between said reproducing element and and said set address signal position is greater than a predetermined distance, and generates said driving voltage with a duty cycle when the distance between said reproducing element and said set address signal position is less than said predetermined distance.

5. A reproducing apparatus as claimed in claim 1 in which said driving voltage generating means comprises at least two resistors connected in series having one end thereof connected to a predetermined voltage source, means for varying a voltage connected to the other end of the series connected resistors according to the kind of said set address signal, and means for obtaining a voltage from a connecting point between the two resistors to form the driving voltage.

6. A reproducing apparatus as claimed in claim 1 in which said driving voltage generating means comprises at least three resistors connected in series having one end thereof connected to a predetermined voltage source, and switching means connected to to a first connection point between a first resistor connected to said predetermined voltage source and a second resistor connected to the first resistor and also connected to a second connection point between the second resistor and a third resistor connected to the second resistor, said switching means switching and obtaining a voltage at said first connection point or said second connection point according to the kind of said set address signal.

7. A reproducing apparatus as claimed in claim 2 in which said first speed is a speed which is approximately 900 times the moving speed of said reproducing element during normal reproduction, and said second speed is a speed which is approximately 600 times the moving speed of said reproducing element during normal reproduction.

* * * * *